United States Patent [19]

Demchak et al.

[11] 4,285,131
[45] Aug. 25, 1981

[54] FISHING LINE METER

[76] Inventors: Steve Demchak, c/o George Spector, 3615 Woolworth Bldg., 233 Broadway; George Spector, 3615 Woolworth Bldg., 233 Broadway, both of New York, N.Y. 10007

[21] Appl. No.: 83,606

[22] Filed: Oct. 11, 1979

[51] Int. Cl.³ .............................................. G01B 3/12
[52] U.S. Cl. ................................................. 33/134 R
[58] Field of Search ..................... 33/129, 134; 43/22, 43/25; 242/84.1 K, 84.1 M

[56] References Cited

U.S. PATENT DOCUMENTS

| | | | |
|---|---|---|---|
| 481,792 | 8/1892 | Hutchinson | 33/134 R |
| 2,163,402 | 6/1939 | Mason | 33/134 R |
| 2,500,026 | 3/1950 | Erickson | 33/134 R |
| 2,637,112 | 5/1953 | Fontaine et al. | 33/134 R |
| 2,747,286 | 5/1956 | Bedell | 33/134 R |
| 2,960,773 | 11/1960 | Mott | 33/134 R |
| 3,159,920 | 12/1964 | Garrett | 33/129 |
| 3,308,544 | 3/1967 | White | 33/134 R |
| 3,874,108 | 4/1975 | Connor | 43/25 |

*Primary Examiner*—Harry N. Haroian

[57] ABSTRACT

A device to digitally show the length of fishing line and distance of casting, the device including principally a pulley wheel around which an intermediate portion of the fishing line is looped so that as the line is cast outward, the pulley wheel is then rotated, thus operating a rotary type counter mechanism connected to the pulley wheel shaft, so as to measure the length of fishing line passed from the wheel, the wheel being enclosed in a bell housing supported by a mounting bracket alongside a fishing pole.

3 Claims, 10 Drawing Figures

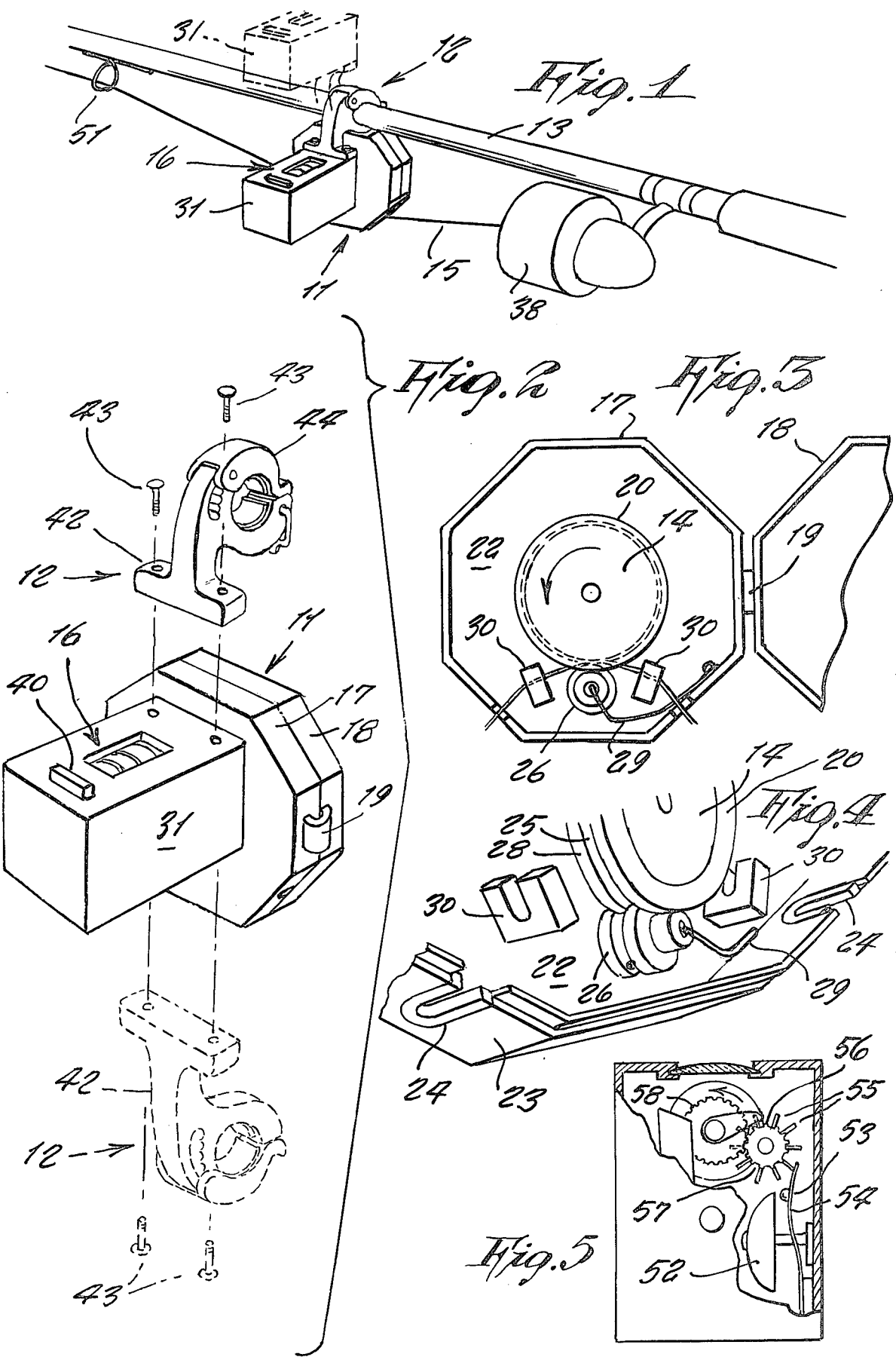

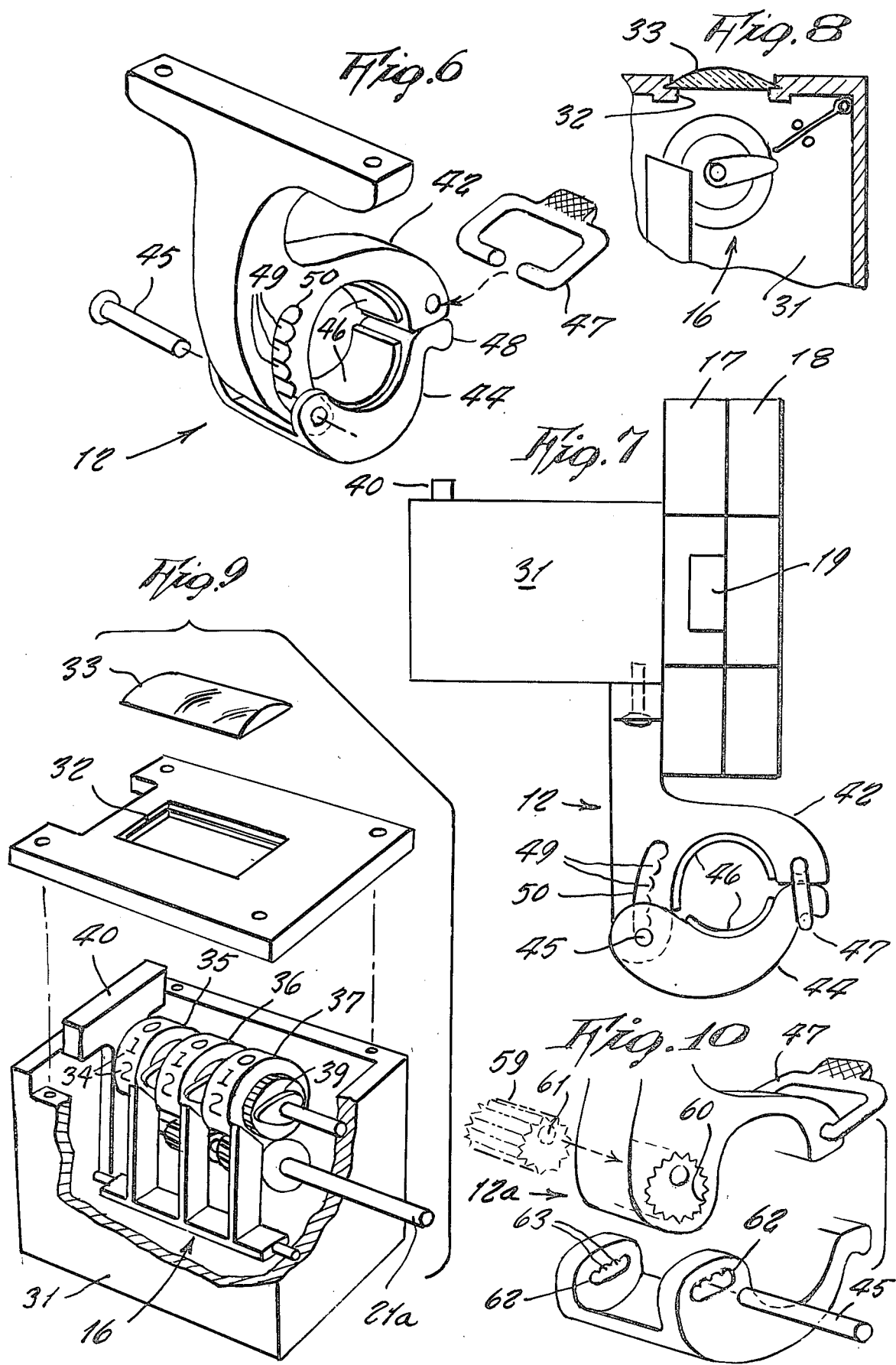

FISHING LINE METER

This invention relates generally to sports fishing accessories.

Practically all fishermen who cast out a fishing line, find it difficult to cast out to a specific area in the water where the fish seem to be, so that sometimes they cast too far or else too close. In an early or initial cast, the fisherman may hook a fish but subsequent castings of the line cannot locate it again. This situation in accordingly in need of an improvement.

Therefore it is a principal object of the present invention to provide a CAST-O-METER attachable to a fishing pole where it can be clearly seen and which indicates the distance that a line is cast, so that the fisherman knows the distance away where the fish are located, and thus in repeated castings he can drop his hook within the same area.

Another object is to provide a cast-o-meter which can be readily and easily mounted on the fishing pole and which is relatively small in size so as to not be cumbersome.

In the drawings:

FIG. 1 is a perspective view of the invention mounted on a fishing pole.

FIG. 2 is a view of the invention shown alone, and indicating reversibility of the mounting bracket position.

FIG. 3 illustrates the fishing line reel case opened up.

FIG. 4 is a detail thereof

FIG. 5 illustrates one design of the invention in which a bell is additionally sounded as specific lengths of line is paid out from the reel, so without reading the computer figures, a fisherman knows, by listening, how much line approximately is cast out.

FIG. 6 is a perspective view of the mounting bracket.

FIG. 7 is a side view thereof mounted on the computer.

FIG. 8 shows a snapping method for audible indication of line cast out.

FIG. 9 is a detail view of the computer.

FIG. 10 illustrates another design of adjustment for a size of fishing pole clamping mouth, this design including a removable, splined barrel having an eccentric hole, so the hole position is adjustable up or down.

Referring now to the drawings in greater detail, the reference numeral 11 represents a cast-o-meter according to the present invention wherein the same is comprised of a bell housing 11, a mounting bracket 12 for attachment to a fishing pole 13, the bell housing containing a pulley wheel 14 around which the fishing line 15 is looped, and the bell housing supporting a counter mechanism 16 to which the mounting bracket is attached.

The bell housing comprises an octagonal-shaped case 17 and cover 18 pivoted thereto by a hinge 19, so that in a closed position they enclose a rubber or urethane rim 20 of the wheel 14 affixed on a shaft 21 that protrudes outward of an endwall 22 of the case and into the counter mechanism. Two notches along the octagonal-shaped edge wall 23 of the case are each lined with a U-shaped Teflon block 24 so to form a chock through which the fishing line slides as it enters and exits the bell housing.

The pulley wheel is circular and includes an annular groove 25 in which the fishing line is looped one or two turns in order to frictionally grasp the same, so that during a casting of the line, the pulley wheel is thus rotated thereby. A follower wheel 26, mounted rotatably free on a pin 27 slidably retained in a slot of end wall 22, is correspondingly contoured so to engage the periphery 28 and the groove 25 of the pulley wheel. A follower spring 29, affixed at one end to the case, bears at its other end against the follower wheel, urging it against the follower wheel, urging it against the pulley wheel. The follower wheel serves to keep the fishing line firmly in the groove.

A pair of notched guide blocks 30 are rigidly affixed to end wall 22 and serve to guide the fishing line in either direction between the Teflon blocks and the pulley wheel, as shown in FIG. 3.

The counter mechanism includes a case 31 having a sight window 32 fitted with magnifying lens 33 in order to view numerals 34 on calibrated deal wheels 35, 36 and 37 of the mechanism. The mechanism is of conventional rotary which adds in an outgoing direction when the fishing line is cast, and which substracts when the line is reeled in by the conventional reel 38 mounted on the fishing pole. Heart shaped corns 39 on the sides of the digit dials are pressed against by three levers 40. The pressure, from pressing a reset button 41, rotates all dials back to a zero position. The input shaft 21 a of the mechanism is attached to or comprises the same shaft 21 on which the pulley wheel 20 is affixed.

The mounting bracket 12, shown in FIGS. 1,2,6 and 7, includes a fixed jaw 42 secured by screws 43 to the counter mechanism case, the fixed jaw supporting a pivotable jaw 44 on a jaw hinge pin 45. The jaws are each lined with a rubber pad 46 for grasping the fishing pole, and the jaws are locked closed by a ring 47 pivotable on one jaw and which clamps across a lip 48 of the other jaw. The jaws are adjustable respective to each other for grasped either a larger or smaller diameter of fishing pole, by means of the hinge pin 45 being selectively journalled in notched portions 49 of a toothed slot 50 on the fixed jaw.

As shown by the solid lines in FIG. 1, the mounting bracket can be secured to an upper side of the counter mechanism case 31, or else as shown by the dotted lines in the figure, the bracket can be secured to an underside of the case. Thus in the latter position the cast-o-meter serves for level wind reeling.

In operative use, the cast-o-meter 10 is mounted on the fishing pole at a location so as to intercept the fishing line as it leaves the reel and extends therefrom to the first guide ring 51 along the pole. A fisherman can read an amount of cast of the fishing line by looking at the reading in the sight window 32 which indicates the number of feet of line cast out. By observing the window, the fisherman can brake the line in case of an overcast thus insuring the hook to drop in the desired area of the water. In case of an undercast, the line can be reeled in and another cast is tried so to get the hook where desired.

In a modified design of the invention shown in FIG. 5, the above described counter mechanism additionally includes a sound producing means for informing a fisherman when certain casting distances are attained, so a fisherman need not keep his eyes steadily on the window. This comprises a bell 52 struck by a button 53 on a spring arm 54 that is push back into a cocked position by a tooth 55 of a toothed wheel 56 integral with gear 57 engaging a gear 58 affixed to a side of one of the dials. The device may be designed so that a bell ring is produced at every 20 feet of line that is cast, or at an other footage. The fisherman thus listening to the sound, can readily know how many units of 20 feet (or other footage) has been cast out.

In FIG. 10, still another design of mounting bracket 12a includes a means for adjusting the jaws for fitting around different sizes of fishing poles. This comprises a toothed barrel 59 fitting in a toothed opening 60 of the fixed jaw, the barrel having an eccentric hole 61 receiving the jaw hinge pin can be moved for either a large or smaller sized fishing pole. The pivotable jaw includes arcuate slots 62 each of which is toothed so that the pin 45 can be additionally adjusted to rest in either notch 63 thereof, and thus allow the jaw lips to align for locking together by the ring 47. By simply sliding out the barrel and hinge pin, a quick and easy adjustment can be made without need of any tools.

What is claimed or new is:

1. A fishing line, comprising in combination, a housing with pulley wheel rotatably mounted inside said housing, a counter mechanism secured to said housing driven by said pulley wheel, and a mounting bracket secured to said housing on a side of a fishing pole having a fishing line which is looped around said pulley wheel, wherein said housing comprises a case and pivotable cover for access to said pulley wheel and line including spaced notches through said housing for said line to move through said housing when closed wherein said counter mechanism is driven by a shaft on which said pulley wheel is affixed, said shaft extending through said housing including a follower wheel in said housing retaining said line on said pulley wheel wherein said counter mechanism includes a bell and means driven by said counter mechanism striking the bell at predetermined intervals.

2. The combination as set forth in claim 1 wherein said mounting bracket includes a fixed jaw with a pin mounted therethrough, a pivotable jaw mounted about said pin, said fixed jaw including means for adjusting the axial location of said pin whereby said jaws will be adapted to accept poles of varying diameter.

3. The combination as in claim 2 wherein said means comprises an eccentric pin adjustably mounted in said fixed jaw, said movable jaw having a plurality of slots to receive said pin in different axial settings.

* * * * *